United States Patent [19]

Bartenstein et al.

[11] Patent Number: 5,582,311
[45] Date of Patent: Dec. 10, 1996

[54] PORTABLE LIQUID STORAGE TANK WITH EXTERNAL FRAME

[75] Inventors: Dwight F. Bartenstein, Bakersfield; Douglas W. Baker, Long Beach; James N. Holmes, Irvine, all of Calif.

[73] Assignee: Baker Tanks, Inc., Rancho Dominguez, Calif.

[21] Appl. No.: 479,227

[22] Filed: Jun. 7, 1995

Related U.S. Application Data

[63] Continuation of Ser. No. 102,475, Aug. 2, 1993, abandoned.

[51] Int. Cl.⁶ ........................................ B65D 7/04
[52] U.S. Cl. .................. 220/4.12; 220/646; 220/647
[58] Field of Search ............................ 220/648, 647, 220/650, 562, 565, 4.12

[56] References Cited

U.S. PATENT DOCUMENTS

| | | | |
|---|---|---|---|
| 128,144 | 6/1872 | Hemp et al. | 220/648 |
| 749,199 | 1/1904 | Jones | 220/647 |
| 1,280,440 | 10/1918 | Goldowitz | 220/650 |
| 3,047,189 | 7/1962 | Paul | 220/650 |
| 3,661,293 | 5/1972 | Gerhard et al. | 220/650 |
| 4,412,626 | 11/1983 | Gerhard | 220/646 |
| 5,083,327 | 1/1992 | Gillebaard | 220/648 |

*Primary Examiner*—Joseph M. Moy
*Attorney, Agent, or Firm*—Jeffer, Mangels, Butler & Marmaro LLP

[57] ABSTRACT

A portable liquid storage tank has an external frame and internal walls defining an at least partially enclosed storage volume for liquids. The rigid frame includes a plurality of members connected by moment-resisting joints. The tank walls are formed of a plurality of plates affixed within the tank frame. The liquid storage volume defined by the tank walls is free of structures which can trap liquids.

14 Claims, 6 Drawing Sheets

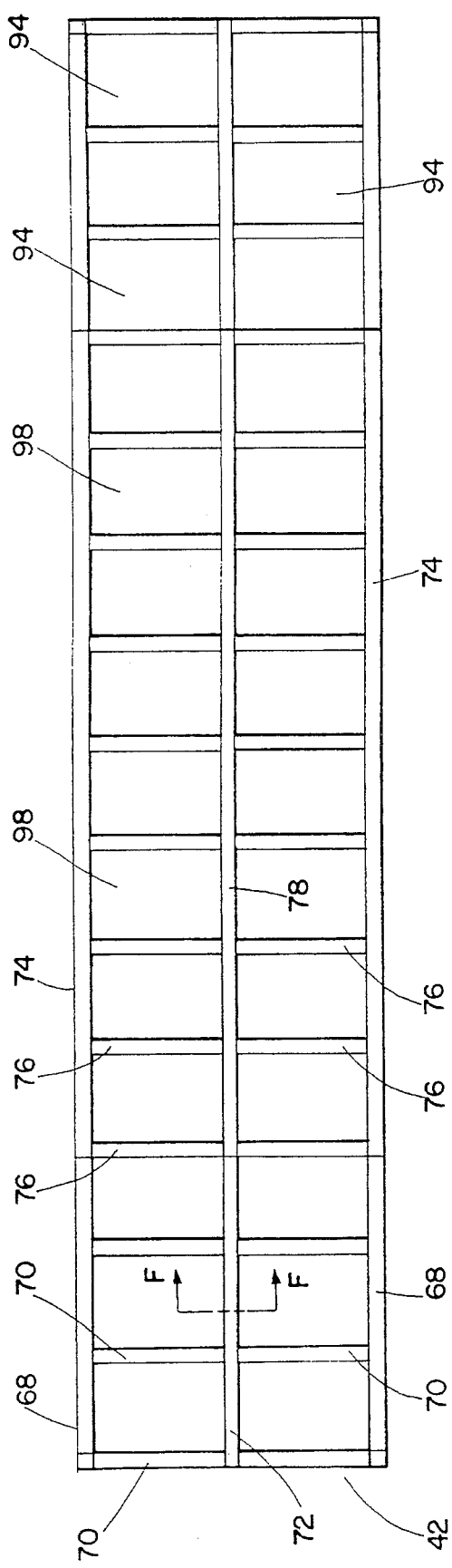
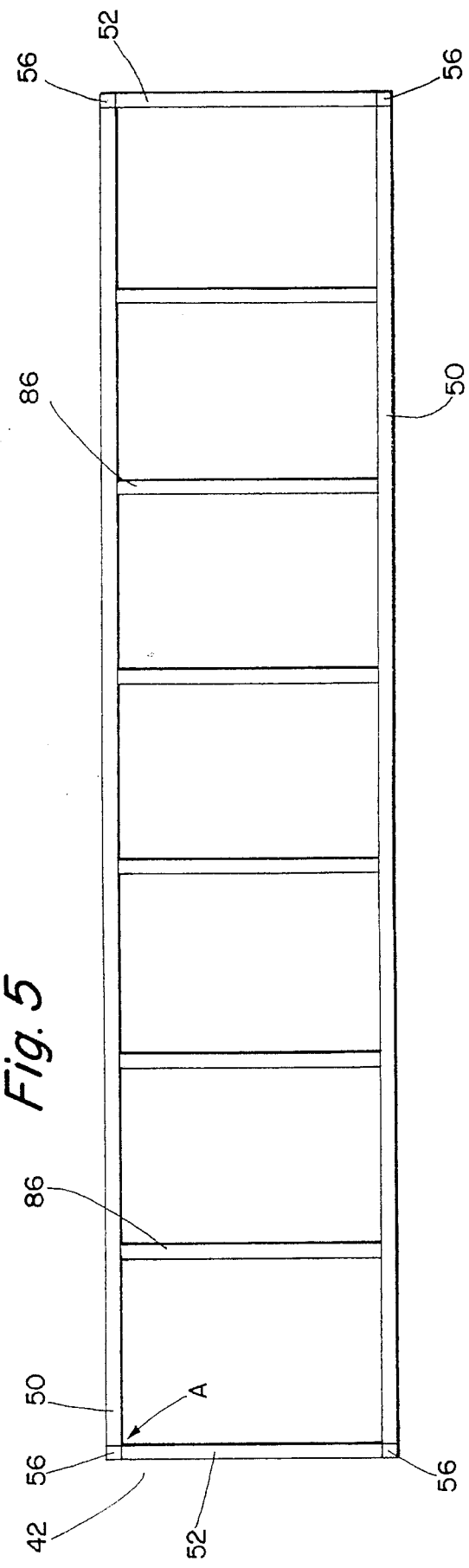
Fig. 4
Fig. 5

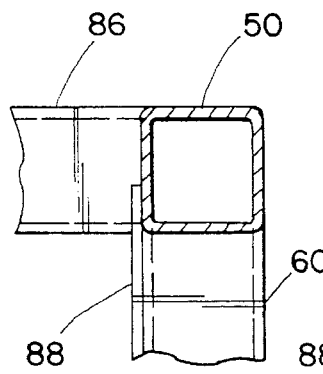
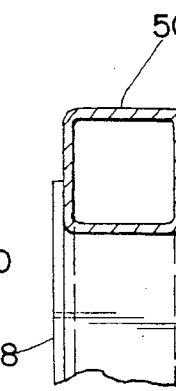
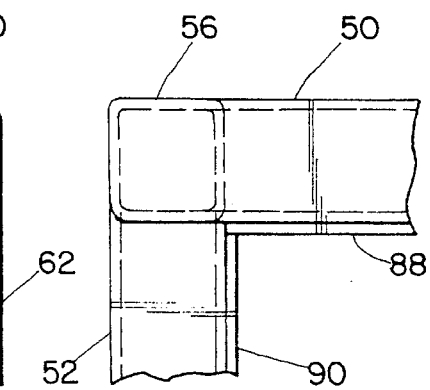
Fig. 8   Fig. 9   Fig. 6
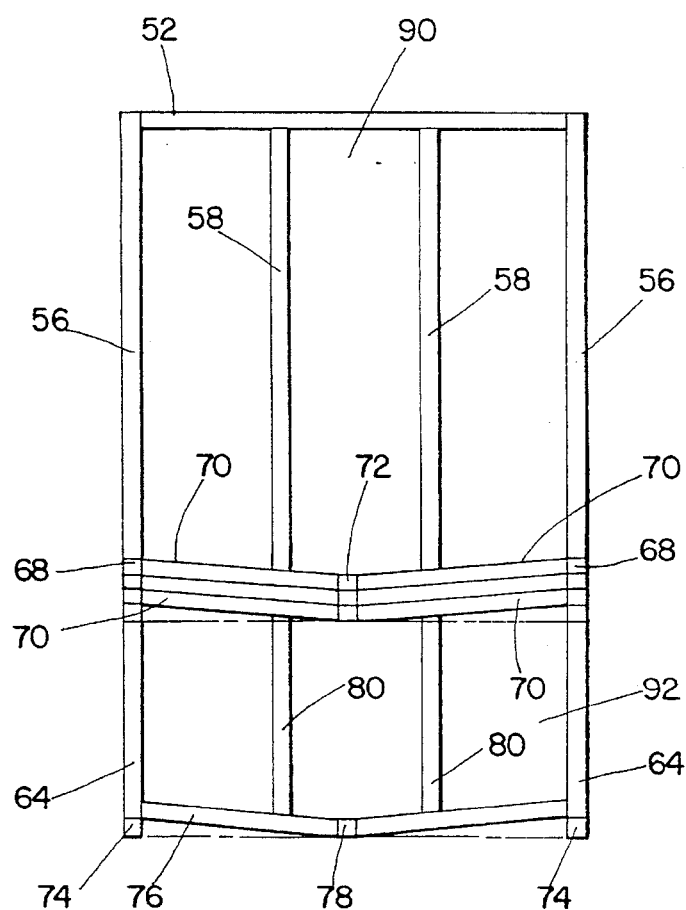
Fig. 7
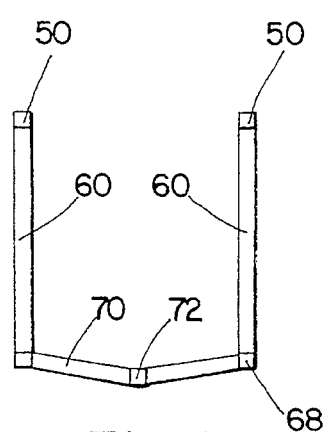
Fig. 10
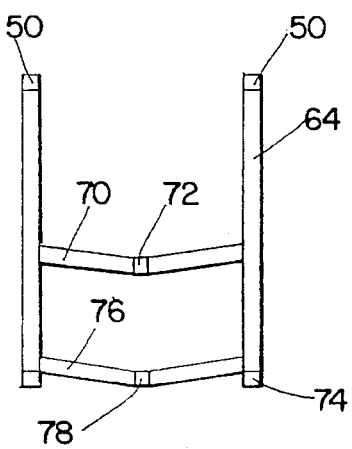
Fig. 11

PORTABLE LIQUID STORAGE TANK WITH EXTERNAL FRAME

This application is a continuation of application Ser. No. 08/102,475, filed Aug. 2, 1993 now abandoned.

FIELD OF THE INVENTION

The present invention relates to an improved portable liquid storage tank. More specifically, the present invention relates to a portable liquid storage tank which is easy to clean and maintain.

BACKGROUND OF THE INVENTION

Portable liquid storage tanks are employed in a wide variety of activities requiring temporary liquid storage. Such activities include contaminated ground water treatment, liquid waste reduction, chemical cleaning of heat exchangers, chemical test projects, boiler cleaning, ship and barge cleaning, sludge pond clean-up and removal, oil and water separation, tank cleaning and maintenance, underground tank removal, repair and replacement, pipeline cleaning and hydrostatic testing, and use as temporary catch basins for rain water. Various types of portable liquid storage tanks are in use, including polyethylene tanks, vapor-tight steel tanks, and open and closed top steel tanks. Portable tanks typically are transported by trailer, or are mounted on dollies and equipped with hitches to permit towing.

A typical known portable steel tank, denoted 10 in FIGS. 1 and 2, is generally rectangular viewed from above. Tank 10 has a central section 12 and two end sections 14 having poop decks 16 which are vertically offset from the bottom 18 of central section 12 to accommodate a dolly 20 and a trailer hitch 22 at either end, and which are inclined toward central section 12 to facilitate liquid drainage. Tank 10 includes frame 24 comprising a plurality of members 26 (frame 24 is here shown in simplified form, with a reduced number of frame members 26, for illustrative convenience). Members 26 of frame 24 can also include internal bracing members (not shown), as well as bracing members extending across the top opening of the tank (partially shown in FIG. 2). Frame 24 is typically constructed using post-and-beam fabrication with pinned joints 28 connecting members 26. Walls 30 comprise a plurality of plates 32 attached to the outside of frame 24 and define storage volume 34 within tank 10. Outlet valve 36 in the bottom of tank 10 allows drainage of liquid from the tank 10.

Another known portable liquid storage tank is similar to the preceding tank, but employs corrugated steel walls, typically with corrugations of from one to four inches in depth.

Known portable steel tanks suffer from a number of disadvantages. For example, the intersections at which the internal frame members 26 meet plates 32 forming the floor of central section 12 create traps 38 (shown in FIG. 2) within storage volume 34, blocking the fluid flow path to outlet valve 36 and making thus it difficult to drain all stored liquid and to clean the tank after the liquid is removed. Failure to remove all residual liquids results in contamination of subsequent stored liquids. Tank failure can result due to excessive deflection or flexure of tank walls 30, particularly as a consequence of excessive vibration during transport of the tank which can cause separation of wall plates 32. Furthermore, contact of corrosive liquids, such as acidic sludges, drilling muds, and other toxic wastes damages frame members 26 and wall plates 32 and can ultimately result in tank failure. Even without tank failure, replacement of frame members 26 and wall plates 32 damaged by contact with corrosive liquids is difficult, time consuming and expensive.

Tanks having corrugated steel walls also suffer from the disadvantage that the walls themselves are susceptible to attack from corrosive liquids. These tanks are even more difficult and costly to clean than tanks having flat wall sections. The cleaning process is labor-intensive and potentially dangerous to workers who are required to physically enter the tank.

A need has existed for a portable liquid storage tank which does not trap liquids and thus is easy to drain completely and easy to clean after use. It would further be desirable to provide a portable liquid storage tank having a structure which is less susceptible to attack from corrosive liquids stored therein.

A need has also existed for a portable liquid storage tank which can be transported with reduced risk of tank wall failure.

SUMMARY OF THE PREFERRED EMBODIMENTS

In accordance with one aspect of the present invention, there has been provided a portable storage tank having a rigid external frame and internal walls defining an at least partially enclosed storage volume for liquids. The external frame includes a plurality of members connected by moment-resisting joints. The tank walls are formed of a plurality of plates affixed within the tank frame. The liquid storage volume defined by the tank walls is free of structures which can trap liquids.

In a more specific aspect of the present invention, the frame members are tube steel members having a rectangular or square cross-section. Preferably, the members are formed of a steel having a yield stress of at least about 46,000 psi.

In another preferred aspect of the present invention, poop decks having a V-shaped cross-section are employed. Such a configuration further facilitates cleaning in that stored liquids are channeled to the center of the poop decks as well as downward and toward the central section of the tank.

In a further aspect of the present invention, the portable liquid storage tank includes a plurality of braces within the liquid storage volume. The braces are so configured as not to form traps for liquids.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIGS. 3–5 are somewhat schematic side elevation, bottom plan and top plan views, respectively, of an embodiment of a portable liquid storage tank of the invention, showing the tank frame surrounding the wall plates which define the liquid storage volume, with FIG. 4 being a view from the bottom up (in the direction denoted by "IV - - >" in FIG. 3) and FIG. 5 being a view from the top down (in the direction denoted by "V - - >" in FIG. 3);

FIG. 6 is a partial cross-sectional view of corner "A" in FIG. 5, viewed from the top downward;

FIG. 7 is an end schematic view of the tank of FIG. 3, showing the relation of the upper and lower sections of the tank and showing a preferred V-shaped poop deck;

FIG. 8 is a partial cross-sectional view of the tank frame joint along "B—B" in FIG. 3;

FIG. 9 is a partial cross-sectional view of the tank frame joint along "C—C" in FIG. 3;

FIG. 10 is a partial cross-sectional view of the tank of FIG. 3 along "B—B";

FIG. 11 is a partial cross-sectional view of the tank of FIG. 3 along "D—D";

In the drawings, like elements are numbered like throughout.

DETAILED DESCRIPTION OF PREFERRED EMBODIMENTS

Figure 3:
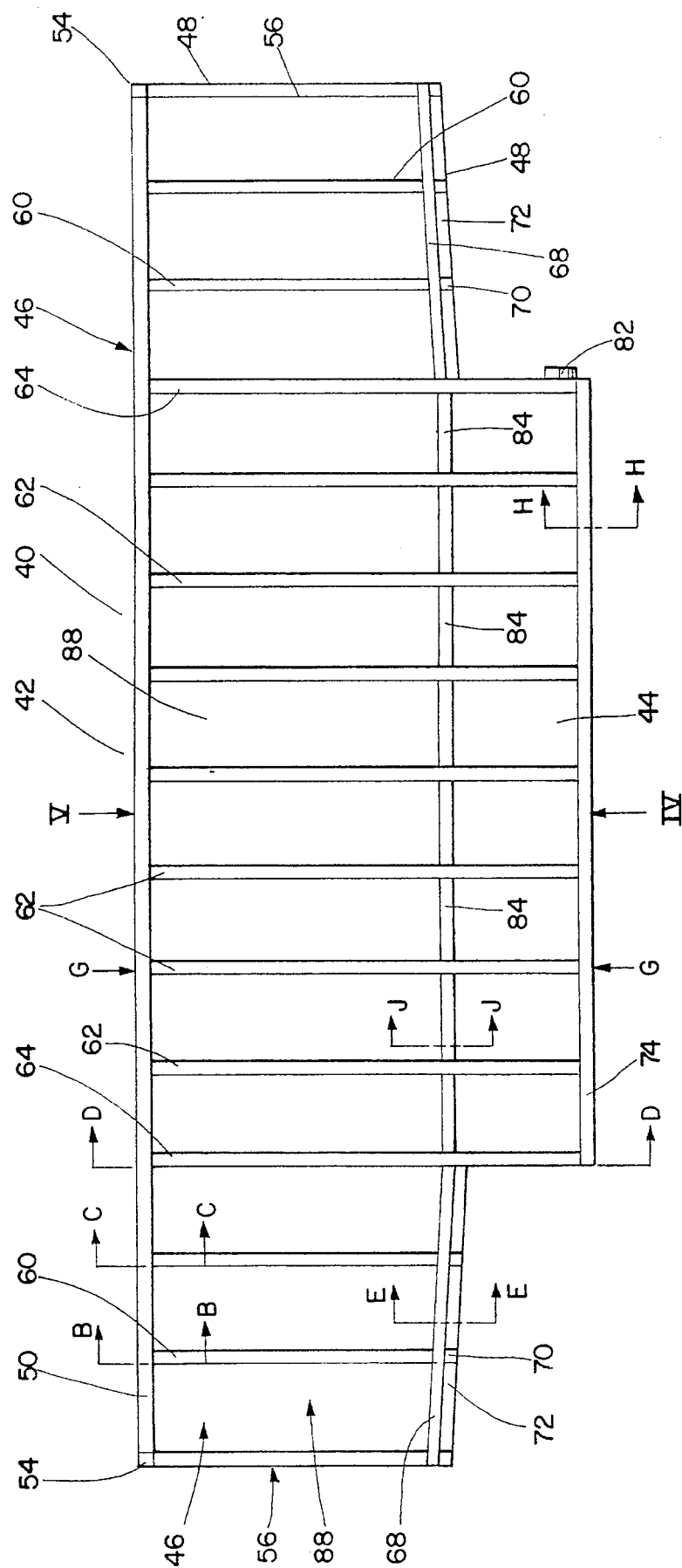

Referring now to the drawings, FIGS. 3–5 show an embodiment of a portable liquid storage tank 40 having a central section 42 with a lower portion 44, and end sections 46. Tank 40 includes a rigid frame 48 which is formed of parallel horizontally extending upper side edge members 50 and upper end edge members 52. Members 50 and 52 define a rectangular upper edge. At each upper corner 54 of tank 40 members 50 and 52 join with end section corner member 56 (shown in FIG. 6).

A plurality of vertically extending members are joined to edge members 50 and 52, including end section end wall members 58 (shown in FIG. 7), end section side wall members 60, central section side wall members 62 (shown in FIGS. 8 and 9), and connecting side wall members 64 connecting central section 42 and end sections 46.

Figure 12:
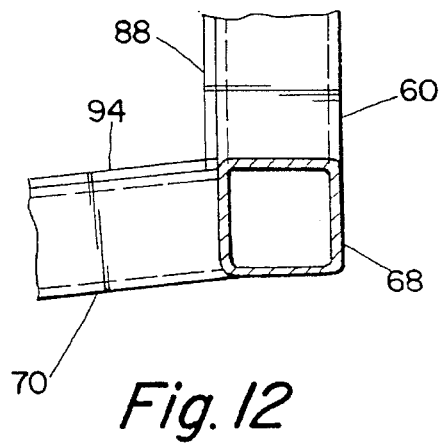
FIG. 12 is a partial cross-sectional view of a lower corner along "E—E" in FIG. 3.

End section side wall members 60 are joined to end section lower side edge members 68, which in turn are joined to end section floor members 70 (shown in FIGS. 10, 11 and 12). End section end wall members 58 extend between and are joined with upper edge members 52 and end section floor members 70 with which they are coplanar. Edge members 68 and floor members 70 preferably join at a selected angle, preferably at an angle of about 95° to define a poop deck floor which slopes inward. Such inward-sloping poop decks confer the additional advantage of providing a third cleaning action to the tank, namely a channeling of fluids away from the tank walls, to supplement the downward slope of the end section and the force of any cleaning liquids, such as water from a high-pressure hose, which is employed in the cleaning process. Inward-sloping poop decks are especially advantageous when the stored liquid is a heavy sludge, mud, etc.

Figure 1:
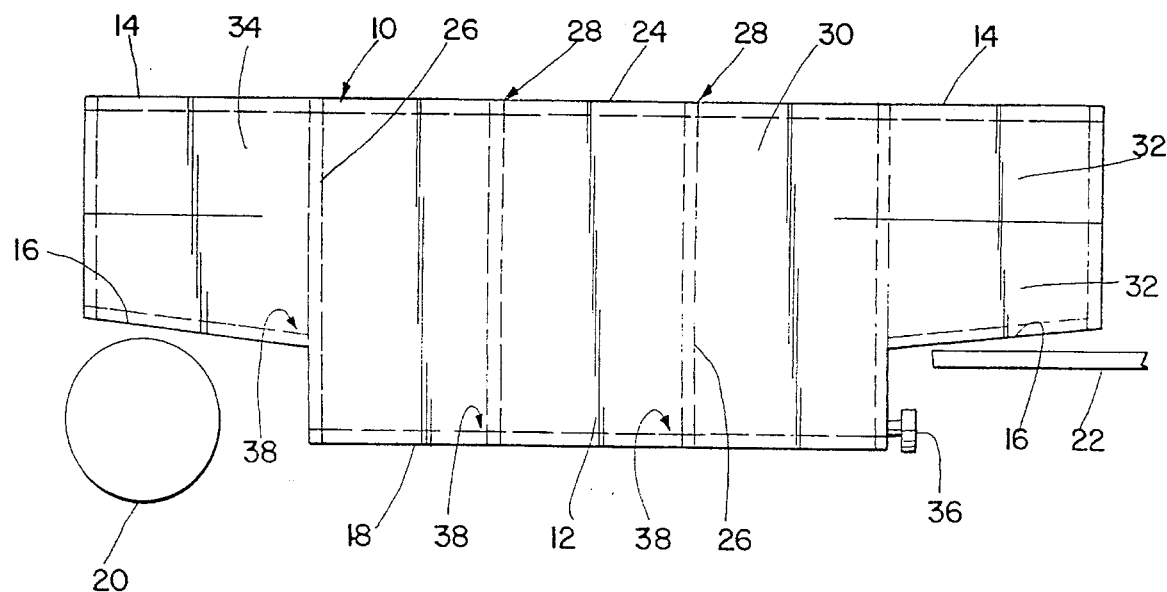
FIG. 1 is a side elevation view of an illustrative portable liquid storage tank of the prior art, showing the locations of frame members within the tank.
Figure 15:
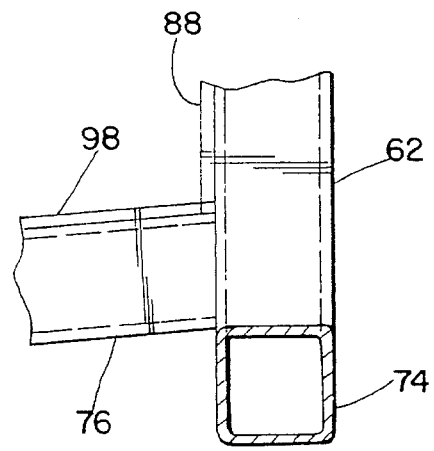
FIG. 15 is a partial cross-sectional view of the tank frame joint along "H—H" in FIG. 3.

Floor members 70 in turn are joined to end section keels 72 (shown in FIG. 13), which can be offset below edge members 52 to accommodate inward-sloping floor members 70, or coplanar with edge members 52. Central section side wall members 62 are joined to central section lower edge members 74. Also joined to wall members 62 (shown in FIGS. 1, 14 and 15) are central section floor members 76, which also preferably form an angle of about 95° with wall members 62.

Figure 13:
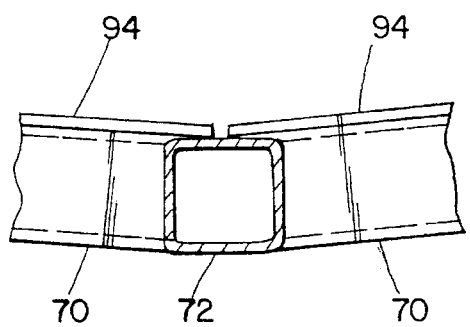
FIG. 13 is a partial cross-sectional view of the tank frame joint along "F—F" in FIG. 4.
Figure 14:
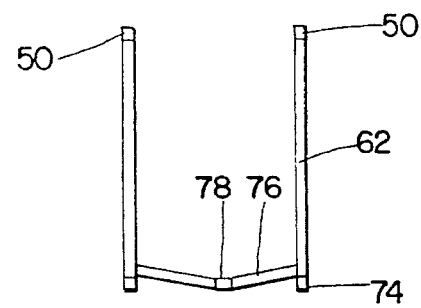
FIG. 14 is a partial cross-sectional view of the tank of FIG. 3 along "G—G" in FIG. 3.
Figure 16:
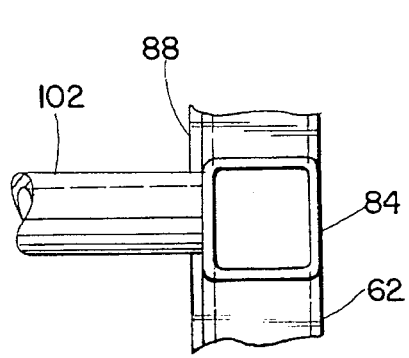
FIGS. 16 and 17 are partial cross-sectional views through and facing an internal brace joint along "J—J" in FIG. 3.

Floor members 76 are in turn joined to central section keel 78 in a manner similar to that shown in FIG. 13 for end section floor members 70 and end section keel 72.

Connecting side wall members 64 extend between and are joined to upper side edge members 50 and central section lower edge members 74. End section lower side edge members 68 are joined to connecting side wall members 64 as shown. In FIG. 7, lower central section end wall members 80 extend between and join the end section floor members 70 and central section floor members 76 with which they are coplanar.

As noted, end section lower side edge members 68, floor members 70 and keels 72 preferably are inclined slightly from the horizontal. This allows liquids stored within tank 40 to flow out of the end sections 46 into the lower portion 44 of central section 42. Floor members 76 of central section 42 are likewise inclined, affording drainage of the stored liquid through outlet valve 82.

Side spacing members 84 define the top of lower portion 44 of central section 42, and are disposed between and joined with adjacent pairs of central section side wall members 62, and also between connecting side wall members 62 and adjacent central section side wall members 62.

Preferably, a plurality of upper cross members 86 extend across the width of tank 40 joining with opposite upper side edge members 50, as shown in FIGS. 5 and 8.

It is essential to the invention that rigid-frame construction techniques are employed to form the structural joints between the various members 50–86 of frame 42. Prior to the present invention, rigid frames have not been used or suggested for use in portable liquid storage tanks, but have been used primarily in the construction, for example, of buildings such as churches, auditoriums and shopping centers. The design and production of rigid frames is known to the art. See, e.g., F. S. Merritt, *Building Design and Construction Handbook*, 4th ed., pp. 8–13 to 8–14 (McGraw-Hill 1982), and F. S. Merritt, *Standard Handbook for Civil Engineers*, 3rd ed., pp. 6–64 to 6–71 (McGraw-Hill 1983), which are incorporated by reference herein.

Rigid-frame construction forms structural joints, also known as moment-resisting joints, between members such that the joints themselves resist encountered stresses. In a tank of the present invention, such joints transfer from one member to another any encountered stresses, without joint failure. This is in contrast to the typical post-and-beam construction techniques using pinned joints, which are employed in building known portable liquid storage tanks.

By way of comparison, in standard post-and-beam construction, the moment m of a beam of length I having a uniform load w applied thereto is given by $$m = wl^2/8$$

while for a rigid frame, the moment is given by $$m = wl^2/12$$

which is one-third less. Thus, frame members utilized in the construction of tanks within the scope of the invention can be much lighter than corresponding frame members used in known tanks. Typically, frame members employed according to the invention can be as light as two-thirds the weight of the corresponding frame members used in known tanks.

Details of moment-resisting joints in the rigid frame of a tank within the invention are shown in FIGS. 6–17. Frame members preferably are welded together in the configurations shown, more preferably using fillet welds all around the joints. Wall sections are preferably stitch or seal welded to the appropriate frame members.

Frame members of the invention preferably are comprised of tube steel, very preferably having a rectangular or square cross-section as shown. The frame members may be comprised of steel having a yield stress of at least about 46,000 psi, and preferably, at least about 50,000 psi. The higher yield stress materials allow use of members having thinner walls. This allows production of a tank that is lighter in weight, resulting in cost savings and also reduced road damage when the tank is transported.

Figure 2:
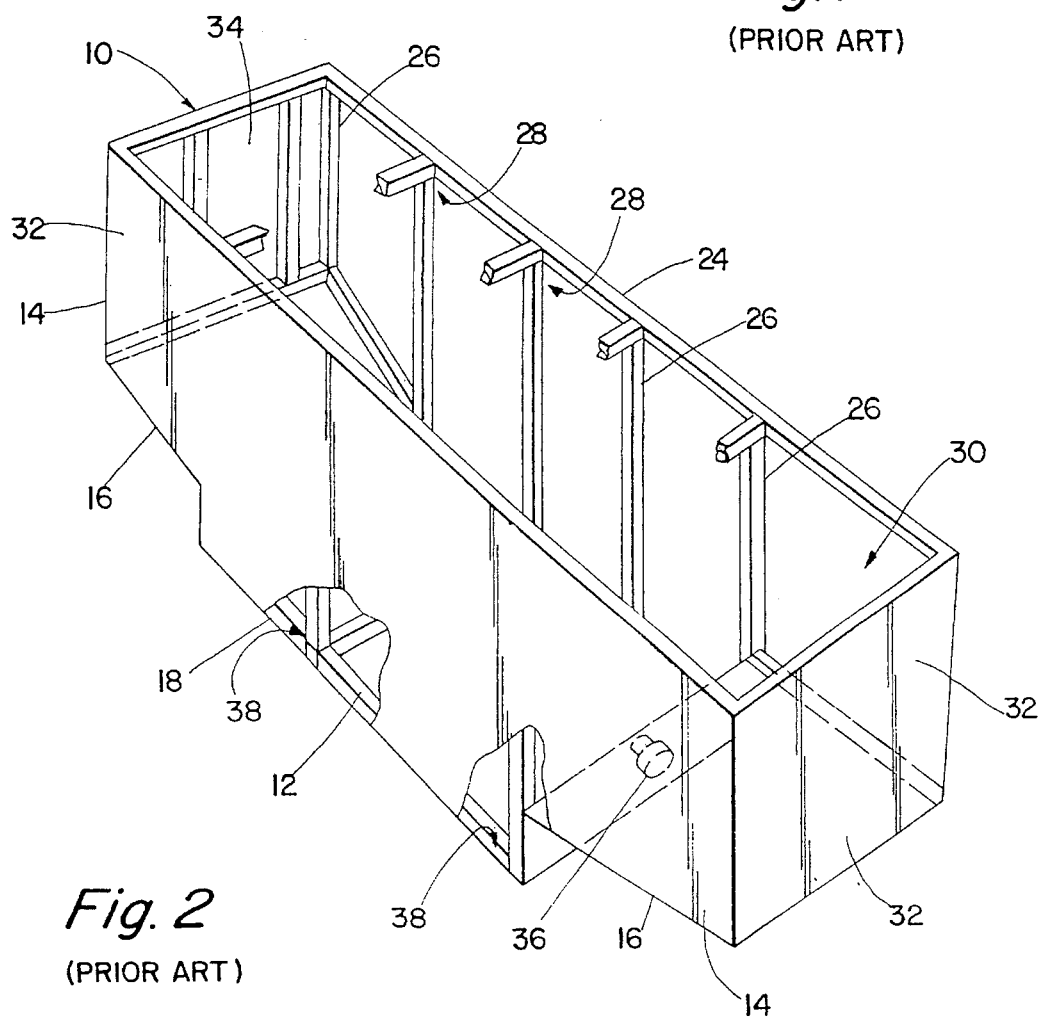
FIG. 2 is a partially cutaway, perspective view of the tank of FIG. 1.
Figure 19:
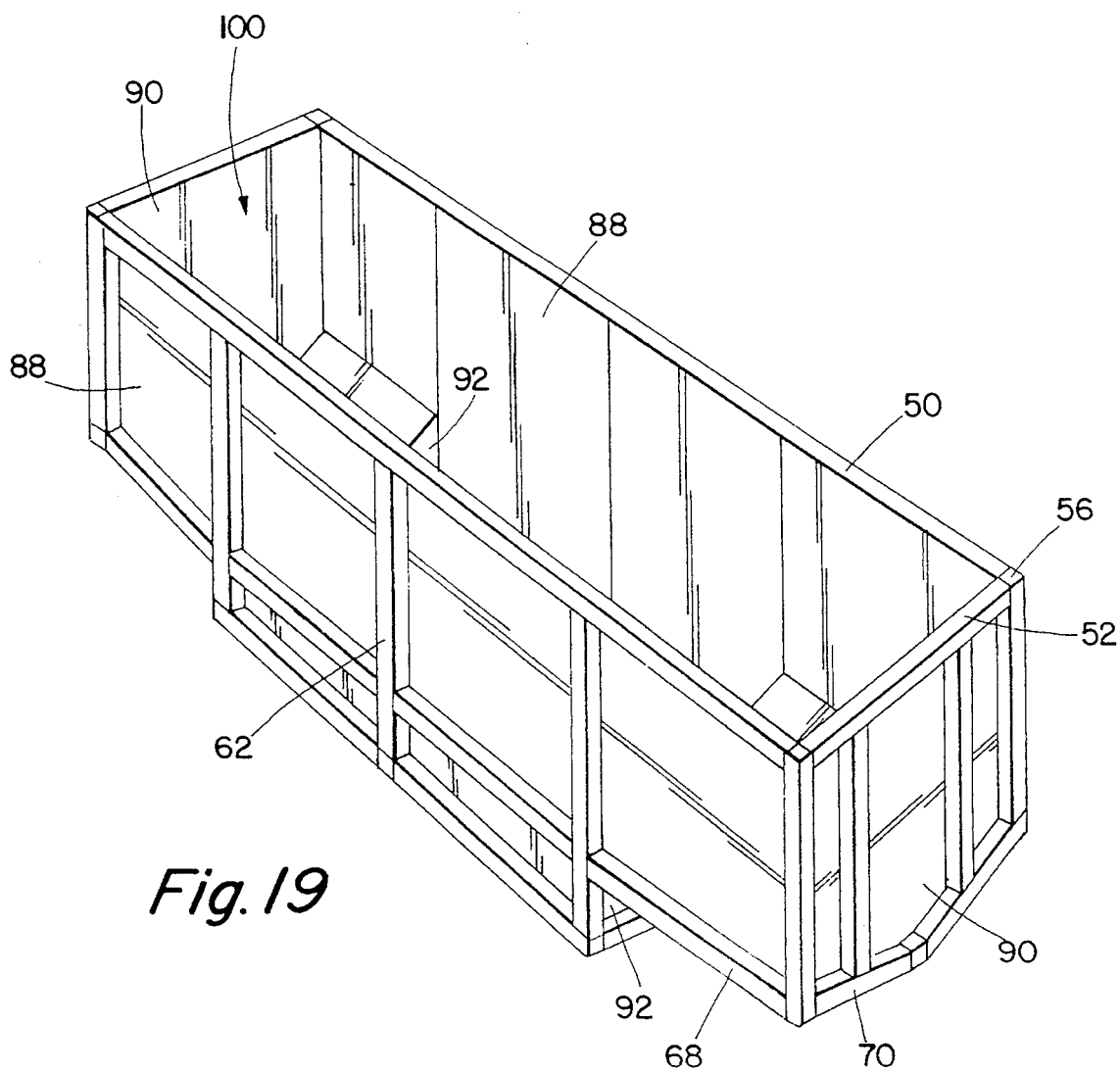
FIG. 19 is a perspective view of an embodiment of a tank according to the invention, showing the relationship of the frame and walls to the liquid storage volume.

Side wall sections 88, upper end wall sections 90, lower end wall sections 92, end floor sections 94 defining poop decks 96, and central floor sections 98 are affixed, as mentioned preferably by welding, to the inside of frame 42. These wall sections preferably are comprised of steel plate. All joints between wall sections preferably are stitch or seal-welded (indicated by "x" in FIG. 17). The various wall sections affixed to the inside of frame 42 define a liquid storage volume 100, as shown in FIG. 19, which is free of structures such as intersections and corners which can form liquid traps (compare trap 38 in FIG. 2) and thus prevent complete draining of the tank 40 as well as cause difficulties in cleaning the tank.

Figure 17:
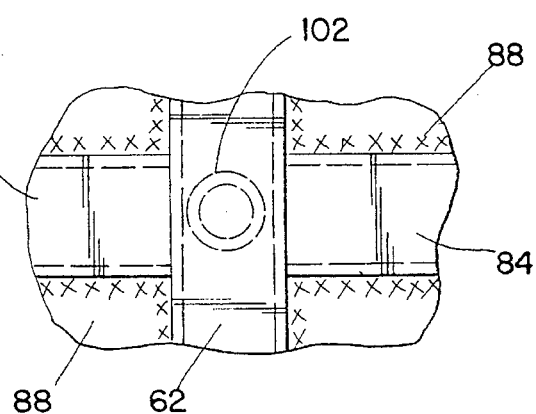
Figure 18:
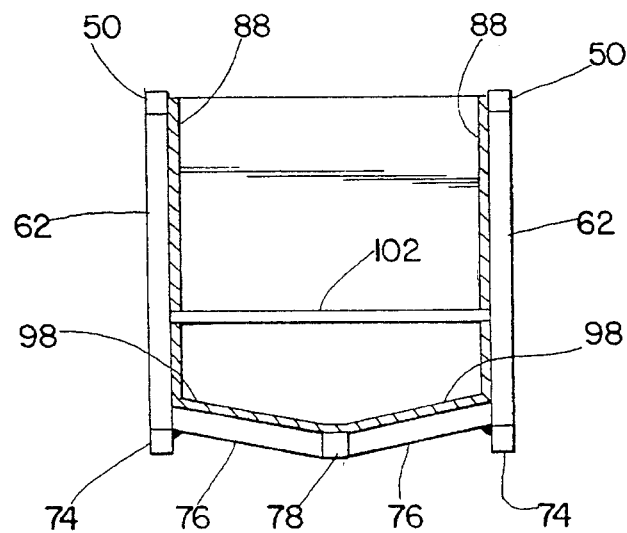
FIG. 18 is a cross-sectional view through the point denoted "J—J" in FIG. 3, showing the orientation of an internal brace in a preferred embodiment of a tank according to the invention.

In a preferred embodiment, a tank within the invention can include one or more internal braces 102, preferably three or fewer. Typical braces 102 extend across the top of lower portion 44 of central section 42. It is preferred that braces 102 are affixed, preferably welded, directly to frame members. For example, braces 102 can be affixed to members 62 at the level of members 84, as shown in FIGS. 17 and 18. Openings preferably are provided in side wall sections 88 to permit braces 102 to directly contact members 62. Once in place, the joints between side wall sections 88 and braces 102 are welded. Braces 102 are configured such that, when in place, they do not form liquid traps. This is typically achieved by using braces of circular cross-section, although other braces can be employed as long as no liquid traps are formed. The braces can be, for example, structural steel bars having a circular cross-section.

Selection of the dimensions of tanks of the invention and of the various frame members, internal braces and wall sections which comprise the tanks will be made based on numerous criteria such as the volume of liquid to be stored, availability of materials, costs of manufacture, etc. The number and spacing of the various frame members 60, 62, 70 and 76 are determined in order to afford desired structural properties such as tank weight. In particular, care must be taken to provide a frame structure which affords the desired maximum wall deflection. Preferably, the maximum wall deflection does not exceed about 3/16 inch, and more preferably does not exceed 1/8 inch, per wall under 3 psi pressure.

Portable liquid storage tanks may also require certification from the U.S. Department of Transportation if certain tank dimensions, such as width and travel height (i.e., the height of the tank when mounted on a dolly and towed) exceed specified values. Tanks within the present invention can be constructed to have a desired liquid storage volume, for example about 20,000 gallons, without the need for additional certification from the Department of Transportation. Tanks within the invention can also be configured to be compact and highly maneuverable, allowing access to a wide range of use sites which may be difficult to reach with known portable liquid storage tanks. Enhanced maneuverability is afforded by tanks which are less than about 39 feet in length.

Exemplary portable liquid storage tanks within the invention can have the following dimensions:

| | |
|---|---|
| length | 28–45 ft |
| width | 8–10 ft |
| travel height | 13–15 ft |
| weight | 17,000–24,200 lb |
| liquid volume | 16,800–21,000 gal |
| wall thickness, plates | 3/16–1/4 inch |
| wall thickness, frame members | 3/16–1/4 inch |
| maximum wall deflection, 3 psi | 1/8–3/16 inch |

Optionally, a tank within the invention can have additional bracing members extending across the open top of the tank. A tank within the invention can also have a cover which closes over the top of the tank to prevent escape of liquids and/or vapors from within the tank volume 100, to protect stored liquids from contamination, etc.

A tank constructed according to the invention thus is easily cleaned, since no liquid traps are present inside the tank. Also, since the tank frame is external, it is not susceptible to attack from corrosive liquids which may be stored therein. Wall sections and internal braces can readily be removed and replaced if necessary, without having to replace tank frame members. Tanks of the invention can also be transported with reduced risk of wall failure. In particular, tanks of the invention have a greater safety margin, that is, a wider margin between the maximum design deflection and the point of wall failure than known tanks.

What is claimed is:

1. In a portable tank for the storage of commercial or industrial liquids having varying specific gravities, said tank including a rigid frame, a plurality of plates and means for towing said tank, said tank having a length, width and volume that permit towing of said tank over a road, the improvement comprising a plurality of tubular members comprised of steel having a yield stress of at least about 46,000 psi and a wall thickness from about 3/16 to 1/4 inch which form said rigid frame, said frame having a length of from about 28 to 45 feet, a width from about 8 to 10 feet and a height from about 13 to 15 feet, and a plurality of flat plates having a wall thickness from about 3/16 to 1/4 inch affixed to said frame within said frame to form a plurality of walls at least partially defining a volume from about 16,800 to 21,000 gallons which is capable of holding a liquid and which is free of liquid traps, wherein the number and spacing of said plurality of tubular members are selected such that said plurality of walls deflect under 3 psi pressure by a maximum of about 3/16 inch, and wherein said tubular members are connected by joints capable of transferring stress between said members without joint failure under said pressure.

2. In a tank for the storage of commercial or industrial liquids having varying specific gravities, said tank including a rigid frame and a plurality of plates, the improvement comprising:

a plurality of tubular members which form said frame, said tubular members being comprised of steel having a yield stress of at least about 46,000 psi, said tubular members comprising (1) a plurality of upper edge members including upper edge side members and upper edge end members, (2) a plurality of lower edge members including lower edge side members and lower edge end members, (3) a plurality of vertically extending members having tops and bottoms including (A) a plurality of corner members each joined to an upper edge side member and an upper edge end member at said top thereof and to a lower edge side member and a lower edge end member at said bottom thereof, (B) a plurality of side wall members joined to said upper and lower edge side members, and (C) a plurality of end wall members joined to said upper and lower edge end members, and (4) a plurality of floor members joined to said lower edge side members, and a plurality of flat plates affixed to said frame within said frame to form a plurality of walls at least partially defining a volume which is capable of holding a liquid and which is free of liquid traps, wherein the number and spacing of said plurality of tubular members are selected such that said plurality of walls deflect under 3 psi pressure by a maximum of about 3/16 inch, wherein said tubular members are connected by joints capable of transferring stress between said members without joint failure under said pressure.

3. In a portable liquid storage tank as claimed in claim 2, the further improvement comprising at least one keel member provided to said frame, and a plurality of floor members joined to said lower edge side members and said keel member.

4. In a portable liquid storage tank as claimed in claim 3, the further improvement comprising a plurality of keel members provided to said frame, at least two of which are vertically offset from one another, with a portion of said plurality of horizontally extending lower edge members and vertically extending members with at least one of said vertically offset keel members being combined to define an end section.

5. In a portable liquid storage tank as claimed in claim 4, the further improvement comprising three keel members provided to said frame., two of which are vertically offset from the remaining keel member, wherein a first portion of said plurality of horizontally extending lower edge members and vertically extending members combine with a first vertically offset keel member to define a first end section, and wherein a second portion of said plurality of horizontally extending lower edge members and vertically extending members combine with a second vertically offset keel member to define a second end section.

6. In a portable liquid storage tank as claimed in claim 4, the further improvement comprising a keel member of said end section Which is displaced downward relative to said horizontally extending lower edge members.

7. In a portable storage tank as claimed in claim 6, the further improvement comprising a plurality of inwardly-sloping plates which are affixed within said end section to define a poop deck.

8. In a method of making a portable tank for the storage of commercial or industrial liquids having varying specific gravities, said method including the steps of forming a rigid frame, affixing a plurality of plates to said rigid frame and providing means for towing said tank, said tank having a length, width and volume that permit towing of said tank over a road, the improvement comprising the steps of forming said rigid frame from a plurality of tubular members comprised of steel having a yield stress of at least about 46,000 psi and a wall thickness from about 3/16 to 1/4 inch, said frame having a length of from about 28 to 45 feet, a width from about 8 to 10 feet and a height from about 13 to 15 feet, and affixing a plurality of flat plates having a wall thickness from about 3/16 to 1/4 inch to said frame within said frame to form a plurality of walls at least partially defining a volume from about 16,800 to 21,000 gallons which is capable of holding a liquid and which is free of liquid traps, wherein the number and spacing of said plurality of tubular members are selected such that said plurality of walls deflect under 3 psi pressure by a maximum of about 3/16 inch, and wherein said tubular members are connected by joints capable of transferring stress between said members without joint failure under said pressure.

9. In a method of making a tank for the storage of commercial or industrial liquids having varying specific gravities, said method including the steps of forming a rigid frame and affixing a plurality of plates to said rigid frame, the improvement comprising the steps of:

forming said rigid frame from a plurality of tubular members comprised of steel having a yield stress of at least about 46,000 psi, said tubular members comprising (1) a plurality of upper edge members including upper edge side members and upper edge end members, (2) a plurality of lower edge members including lower edge side members and lower edge end members, (3) a plurality of vertically extending members having tops and bottoms including (A) a plurality of corner members each joined to an upper edge side member and an upper edge end member at said top thereof and to a lower edge side member and a lower edge end member at said bottom thereof, (B) a plurality of side wall members joined to said upper and lower edge side members, and (C) a plurality of end wall members joined to said upper and lower edge end members, and (4) a plurality of floor members joined to said lower edge side members, and affixing a plurality of flat plates to said frame within said frame to form a plurality of walls at least partially defining a volume which is capable of holding a liquid and which is free of liquid traps, wherein the number and spacing of said plurality of tubular members are selected such that said plurality of walls deflect under 3 psi pressure by a maximum of about 3/16 inch, and wherein said tubular members are connected by joints capable of transferring stress between said members without joint failure under said pressure.

10. In a method of making a portable liquid storage tank as claimed in claim 9, the further improvement comprising the step of providing said frame with at least one keel member, and joining a plurality of floor members to said lower edge side members and said keel member.

11. In a method of making a portable liquid storage tank as claimed in claim 10, the further improvement comprising the step of providing said frame with a plurality of keel members at least two of which are vertically offset from one another, and combining a portion of said plurality of horizontally extending lower edge members and vertically extending members with at least one of said vertically offset keel members to define an end section.

12. In a method of making a portable liquid storage tank as claimed in claim 11, the further improvement comprising the step of providing said frame with three keel members, two of which are vertically offset from the remaining keel member, wherein a first portion of said plurality of horizontally extending lower edge members and vertically extending members combine with a first vertically offset keel member to define a first end section, and wherein a second portion of said plurality of horizontally extending lower edge members and vertically extending members combine with a second vertically offset keel member to define a second end section.

13. In a method of making a portable liquid storage tank as claimed in claim 4, the further improvement comprising the step of displacing said keel member of said end section downward relative to said horizontally extending lower edge members.

14. In a method of making a portable storage tank as claimed in claim 13, the further improvement comprising the step of affixing a plurality of inwardly-sloping plates within said end section to define a poop deck.

* * * * *